United States Patent
Gessner et al.

(10) Patent No.: US 6,516,472 B2
(45) Date of Patent: *Feb. 11, 2003

(54) NONWOVEN FABRICS AND FABRIC LAMINATES FROM MULTICONSTITUENT POLYOLEFIN FIBERS

(75) Inventors: Scott L. Gessner, Encinitas, CA (US); J. Darrell Gillespie, Simpsonville, SC (US); Jared A. Austin, Greer, SC (US); David D. Newkirk, Greer, SC (US); William Fowells, Washougal, WA (US)

(73) Assignee: BBA Nonwovens Simpsonville, Inc., Simpsonville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/773,880

(22) Filed: Jan. 31, 2001

(65) Prior Publication Data

US 2001/0005662 A1 Jun. 28, 2001

Related U.S. Application Data

(62) Division of application No. 08/815,551, filed on Mar. 12, 1997, now Pat. No. 6,207,602, which is a continuation of application No. 08/648,201, filed on May 14, 1996, now abandoned, which is a continuation of application No. 08/344,419, filed on Nov. 23, 1994, now abandoned.

(51) Int. Cl.[7] .......................... A61F 13/15; A61F 13/47; A61F 13/49; A61F 13/53
(52) U.S. Cl. .............................. 2/111; 2/78.3; 604/366; 604/370; 604/401; 442/363; 442/365; 442/398; 442/399; 442/400
(58) Field of Search .................... 2/111, 78.1; 604/401, 604/366, 370; 442/363, 365, 398, 399, 400

(56) References Cited

U.S. PATENT DOCUMENTS

| | | |
|---|---|---|
| 4,563,504 A | 1/1986 | Hert et al. |
| 4,632,861 A | 12/1986 | Vassilatos |
| 4,634,739 A | 1/1987 | Vassilatos |
| 4,644,045 A | 2/1987 | Fowells |
| 4,769,279 A | 9/1988 | Graham |
| 4,770,925 A | 9/1988 | Uchikawa et al. |
| 4,822,678 A | 4/1989 | Brody et al. |
| 4,839,228 A | 6/1989 | Jezic et al. |
| 4,842,922 A | 6/1989 | Krupp et al. |
| 4,874,666 A | 10/1989 | Kubo et al. |
| 4,908,052 A | 3/1990 | Largman et al. |
| 5,068,141 A | 11/1991 | Kubo et al. |
| 5,108,827 A | 4/1992 | Gessner |
| 5,143,779 A * | 9/1992 | Newkirk et al. ............. 428/280 |
| 5,185,199 A | 2/1993 | Sawyer et al. |
| 5,254,299 A | 10/1993 | Krupp et al. |
| 5,294,482 A | 3/1994 | Gessner |
| 5,387,208 A * | 2/1995 | Ashton et al. ............... 428/296 |
| 5,470,639 A * | 11/1995 | Gessner et al. ............. 428/152 |
| 5,487,943 A * | 1/1996 | Kozulla ........................ 428/373 |
| 5,543,206 A * | 8/1996 | Austin et al. ................ 428/198 |
| 5,554,441 A | 9/1996 | Gupta et al. |
| 5,804,286 A * | 9/1998 | Quantrille et al. ........... 428/198 |
| 6,417,121 B1 * | 7/2002 | Newkirk et al. ............. 442/364 |
| 6,417,122 B1 * | 7/2002 | Newkirk et al. ............. 229/120 |

FOREIGN PATENT DOCUMENTS

| | | |
|---|---|---|
| CA | 1193395 | 9/1985 |
| CA | 1199746 | 1/1986 |
| EP | 394954 | 10/1990 |
| EP | 405793 | 1/1991 |
| EP | 416620 | 3/1991 |
| EP | 621356 | 10/1994 |
| JP | 63-243324 | 10/1988 |
| WO | WO 90/10672 | 9/1990 |
| WO | WO 93/15251 | 8/1993 |

* cited by examiner

Primary Examiner—D. R. Wilson
(74) Attorney, Agent, or Firm—Alston & Bird LLP

(57) ABSTRACT

Nonwoven fabrics and fabric laminates are formed from continuous filaments or staple fibers of a select blend of specific grades of polyethylene and polypropylene which give improved fabric performance not heretofore recognized or described, such as high abrasion resistance, good tensile properties, excellent softness and the like. Furthermore, these blends have excellent melt spinning and processing properties which permit efficiently producing nonwoven fabrics at high productivity levels. The polymers are present as a lower-melting dominant continuous phase and at least one higher-melting noncontinuous phase dispersed therein. The lower-melting continuous phase forms at least 70 percent by weight of the fiber and comprises a linear low density polyethylene polymer of a melt index of greater than 10 and a density of less than 0.945 g/cc. At least one higher-melting noncontinuous phase comprises a polypropylene polymer with melt flow rate of greater than 20 g/10 min.

13 Claims, 1 Drawing Sheet

NONWOVEN FABRICS AND FABRIC LAMINATES FROM MULTICONSTITUENT POLYOLEFIN FIBERS

CROSS-REFERENCE TO RELATED APPLICATIONS

This application is a divisional application of Ser. No. 08/815,551, filed Mar. 12, 1997, now U.S. Pat. No. 6,207,602 which is a continuation application of Ser. No. 08/648,201, filed May 14, 1996, now abandoned, which is a continuation application of Ser. No. 08/344,419, filed Nov. 23, 1994, now abandoned.

This invention relates to nonwoven fabrics and to fabric laminates which comprise multiconstituent fibers formed from a select combination of polyolefin polymers. The invention more particularly relates to nonwoven fabrics and laminates of the type described having improved fabric properties and processing characteristics.

Nonwoven fabrics produced from spun polymer materials are used in a variety of different applications. Among other uses, such nonwoven fabrics are employed as the cover sheet for disposable diapers or sanitary products. There is considerable interest in making disposable diapers more comfortable and better fitting to the baby. An important part of the diaper comfort is the softness or hardness of the nonwovens used to make the diaper, including the diaper topsheet, barrier leg cuffs, and in some advanced designs, the fabric laminated to the backsheet film. In some diaper designs, a high degree of fabric elongation is needed to cooperate with elastic components for achieving a soft comfortable fit.

One approach to improved diaper topsheet softness is to use linear low density polyethylene (LLDPE) as the resin instead of polypropylene for producing spunbonded diaper nonwoven fabrics. For example, Fowells U.S. Pat. No. 4,644,045 describes spunbonded nonwoven fabrics having excellent softness properties produced from linear low density polyethylene. However, the above-described softness of LLDPE spunbonded fabric has never been widely utilized because of the difficulty in achieving acceptable abrasion resistance in such products. The bonding of LLDPE filaments into a spunbonded web with acceptable abrasion resistance has proven to be very difficult. Acceptable fiber tie down is observed at a temperature just below the point that the filaments begin to melt and stick to the calender. This very narrow bonding window has made the production of LLDPE spunbond fabrics with acceptable abrasion resistance very difficult. Thus, the softness advantage offered by LLDPE spunbonded fabrics has not been successfully captured in the marketplace.

The present invention is based upon the discovery that blending a relatively small proportion of polypropylene of a select class with the polyethylene imparts greatly increased abrasion resistance to a nonwoven fabric formed from the polymer blend, without significant adverse effect on the fabric softness properties. It is believed that the polyethylene and the polypropylene form distinct phases in the filaments. The lower-melting polyethylene is present as a dominant continuous phase and the higher-melting polypropylene is dispersed in the dominant polyethylene phase.

A number of prior publications describe fibers formed of blends of linear low density polyethylene and polypropylene. For example, U.S. Pat. No. 4,839,228 and EP 394,954 teach that useful fibers are formed from blends which are predominantly polypropylene. WO 90/10672 describes that useful fibers are prepared from blends of polypropylene and polyethylene, especially LLDPE, where the ratio of polypropylene to polyethylene is from 0.6 to 1.5. U.S. Pat. No. 4,874,666 describes fibers formed from a blend of LLDPE and high molecular weight crystalline polypropylene of melt flow rate below 20 g/10 minutes. U.S. Pat. No. 4,632,861 and 4,634,739 describe fibers formed from a blend of a branched low density polyethylene blended with from 5 to 35 percent polypropylene.

SUMMARY OF THE INVENTION

In accordance with the present invention, nonwoven fabrics and nonwoven fabric laminates are formed from fibers of a select blend of specific grades of polyethylene and polypropylene which give improved fabric performance not heretofore recognized or described, such as high abrasion resistance, good tensile properties, excellent softness and the like. Furthermore, these blends have excellent melt spinning and processing properties which permit efficiently producing nonwoven fabrics at high productivity levels.

The nonwoven fabrics of the present invention are comprised of fibrous material in the form of continuous filaments or staple fibers of a size less than 15 dtex/filament formed of a dispersed blend of at least two different polyolefin polymers. The polymers are present as a lower-melting dominant continuous phase and at least one higher-melting noncontinuous phase dispersed therein. The lower-melting continuous phase forms at least 70 percent by weight of the fiber. The physical and rheological behavior of these blends is part of a phenomenon observed by applicants wherein a small amount of a higher modulus polymer reinforces a softer, lower-modulus polymer and gives the blend better spinning, bonding and strength characteristics than the individual constituents. The lower melting, relatively low molulus polyethylene provides desirable properties such as softness, elongation and drape; while the higher-melting, higher modulus polypropylene phase imparts one or more of the following properties to the dominant phase: improved ability to bond the web; improved filament tie-down (reduces fuzz); improved web properties—tensiles, and/or elongation and/or toughness; rheological characteristics which improve spinning performance and/or web formation (filament distribution).

According to one advantageous and important aspect of the present invention, the lower-melting continuous phase comprises a linear low density polyethylene polymer of a melt index of greater than 10 (ASTM D1238-89, 190° C.) and a density of less than 0.945 g/cc (ASTMD-792). At least one higher-melting noncontinuous phase comprises a polypropylene polymer with melt flow rate of greater than 20 g/10 min (ASTM D1238-89, 230° C).

In one of the preferred embodiments of the invention, the lower-melting continuous phase forms at least 80 percent by weight of the fiber and comprises a linear low density polyethylene having a density of 0.90–0.945 g/cc and a melt index of greater than 25 g/10 minutes.

In another preferred embodiment, said lower-melting polymer phase comprises linear low density polyethylene as described above and said higher-melting polymer phase comprises an isotactic polypropylene with a melt flow rate greater than 30 g/10 minutes.

In still another preferred embodiment said lower-melting polymer phase comprises at least 80 percent by weight low pressure, solution process, linear short chain branched polyethylene with a melt index of greater than 30 and a density of 0.945 g/cc and said higher-melting polymer phase comprises 1 to 20 percent by weight of isotactic polypropylene.

In another embodiment of the invention, said lower-melting polymer phase comprises linear low density polyethylene with a melt index of 27 and said higher-melting polymer phase comprises an isotactic polypropylene with a melt flow rate of 35 g/10 minutes.

According to another aspect of the present invention, the lower-melting dominant continuous phase is blended with a higher-melting noncontinuous phase of propylene co- and/or ter- polymers. When propylene co-and/or ter- polymers are used as the higher-melting noncontinuous phase, the lower melting continuous phase may be comprised of one or more polyethylenes selected from the group consisting of low density polyethylene, high pressure long chain branched polyethylene, linear low density polyethylene, high density polyethylene and copolymers thereof.

BRIEF DESCRIPTION OF THE DRAWINGS

In the drawings which form a portion of the original disclosure of the invention.

DETAILED DESCRIPTION

Figure 1:
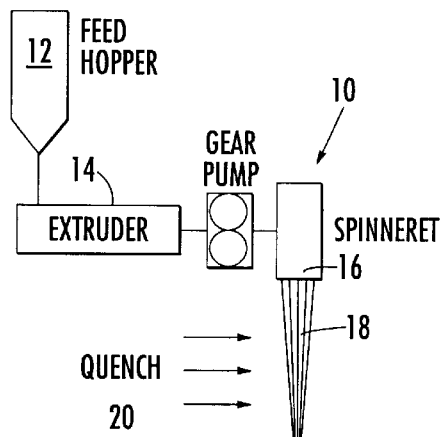
FIG. 1 diagrammatically illustrates one method and apparatus for manufacturing the nonwoven webs according to the invention.

Linear low density polyethylene (LLDPE) is produced in either a solution or a fluid bed process. The polymerization is catalytic. Ziegler Natti and single-site metallocene catalyst systems have been used to produce LLDPE. The resulting polymers are characterized by an essentially linear backbone. Density is controlled by the level of comonomer incorporation into the otherwise linear polymer backbone. Various alpha-olefins are typically copolymerized with ethylene in producing LLDPE. The alpha-olefins which preferably have four to eight carbon atoms, are present in the polymer in an amount up to about 10 percent by weight. The most typical comonomers are butene, hexene, 4-methyl-1-pentene, and octene. The comonomer influences the density of the polymer. Density ranges for LLDPE are relatively broad, typically from 0.87–0.95 g/cc (ASTM D-792).

Linear low density polyethylene melt index is also controlled by the introduction of a chain terminator, such as hydrogen or a hydrogen donator. The melt index for a linear low density polyethylene can range broadly from about 0.1 to about 150 g/10 min. For purposes of the present invention, the LLDPE should have a melt index of greater than 10, and preferably 15 or greater for spunbonded filaments. Particularly preferred are LLDPE polymers having a density of 0.90 to 0.945 g/cc and a melt index of greater than 25.

Examples of suitable commercially available linear low density polyethylene polymers include the linear low density polyethylene polymers available from Dow Chemical Company, such as the ASPUN series of Fibergrade resins, Dow LLDPE 2500 (55 MI, 0.923 density), Dow LLDPE Type 6808A (36 MI, 0.940 density), and the Exact series of linear low density polyethylene polymers from Exxon Chemical Company, such as Exact 2003 (31 MI, density 0.921).

The higher-melting polypropylene component can be an isotactic or syndiotactic polypropylene homopolymer, or can be a copolymer or terpolymer of propylene. The melt flow rate of the polypropylene should be greater than 20 g/10 min., and preferably 25 or greater. Particularly suitable are polypropylene polymers having an MFR of 35 to 65. Examples of commercially available polypropylene polymers which can be used in the present invention include SOLTEX Type 3907 (35 MFR, CR grade), HIMONT Grade X10054-12-1 (65 MFR), Exxon Type 3445 (35 MFR), Exxon Type 3635 (35 MFR) AMOCO Type 10-7956F (35 MFR), and Aristech CP 350 J (melt flow rate approximately 35). Examples of commercially available copolymers of propylene include Exxon 9355 which is a random propylene copolymer with 3% ethylene, 35 melt flow rate; and co- and ter-polymers of propylene from the Catalloy™ series from Himont.

The lower-melting polyethylene component and the higher-melting polypropylene component can be present in proportions ranging from 70 percent by weight polyethylene and 30 percent polypropylene to 99 percent by weight polyethylene and 1 percent polypropylene. In these proportions, the lower-melting polyethylene component is present as a substantially continuous phase and the higher-melting polypropylene is present as a discontinuous phase dispersed in the polyethylene phase.

Appropriate combinations of polymers are combined and blended before being melt-spun into fibers or fibrous webs. A high degree of mixing is used in order to prepare blends in which the polypropylene component is highly dispersed in the polyethylene component. In some cases such mixing may be achieved in the extruder as the polymers are converted to the molten state. However, in other cases it may be preferred to use an extra mixing step. Among the commercially available mixers that can be used are the Barmag 3DD three-dimensional dynamic mixer supplied by Barmag AG of West Germany and the RAPRA CTM cavity-transfer mixer supplied by the Rubber and Plastics Research Association of Great Britain.

The blended polymer dispersion is then either melt-spun into fibers, which may be formed into a web for instance by carding, airlaying, or wetlaying, or melt-spun directly into fibrous webs by a spunbonding or meltblowing process. The web can then be bonded to form a strong, soft biconstituent-fiber nonwoven fabric. Webs of the blended polymer dispersion can be made according to any of the known commercial processes for making nonwoven fabrics, including processes that use mechanical, electrical, pneumatic, or hydrodynamic means for assembling fibers into a web, for example carding, wetlaying, carding/ hydroentangling, wetlaying/hydroentangling, and spunbonding. The webs of the blended polymer dispersion can then be bonded by a multiplicity of thermal bonds to give the webs sufficient strength and abrasion resistance to be useful in, for example, diaper applications. Preferably the bonds are thermal bonds formed by heating the fibers so that via a combination of heat and pressure they become tacky and fuse together at point of contact between the fibers. The thermal bonds may be formed using any of the techniques known in the art for forming discrete thermal bonds, such as calendering. Other thermal bonding techniques, such as through-air bonding and the like, may also be used.

FIG. 1 is a diagrammatical view of an apparatus, indicated generally by the reference number 10, for producing a spunbonded nonwoven web in accordance with the present invention. Various spunbonding techniques exist, but all typically include the basic steps of extruding continuous filaments, quenching the filaments, drawing or attenuating the filaments by a high velocity fluid, and collecting the filaments on a surface to form a web. The spunbonding apparatus 10 is illustrated as a slotdraw type spunbonding apparatus, although, as will be appreciated by the skilled artisan, other spunbonding apparatus may be used. Spunbonding apparatus 10 includes a melt spinning section including a feed hopper 12 and an extruder 14 for the polymer. The extruder 14 is provided with a generally linear die head or spinneret 16 for melt spinning streams of substantially continuous filaments 18. The substantially continuous filaments 18 are extruded from the spinneret 16 and typically are quenched by a supply of cooling air 20. The filaments are directed to an attenuation device 22, preferably in the form of an elongate slot which includes downwardly moving attenuation air which can be supplied from forced air above the slot, vacuum below the slot, or eductively within the slot, as is known in the art. In the attenuation device 22, the filaments become entrained in a high velocity stream of attenuation air and are thereby attenuated or drawn. The air and filaments are discharged from the lower end of the attenuation device 22 and the filaments are collected on a forming wire 24 as a nonwoven spunbond web W.

The web W is conveyed to a bonding station 26 to form a coherent bonded nonwoven fabric. In the embodiment shown, the web is thermally bonded using a pair of heated calender rolls 27 and 28. Thermal bonds are formed by heating the filaments so that they soften and become tacky, and fuse together contacting portions of the filaments. The operating temperature and the compression force of the heated rolls 27 and 28 should be adjusted to a surface temperature and pressure such that the filaments present in nonwoven web soften and bind the fibrous nonwoven web to thereby form a coherent nonwoven fabric. The pattern of the calender rolls may be any of those known in the art, including point bonding patterns, helical bonding patterns, and the like. The term point bonding is used herein to be inclusive of continuous or discontinuous pattern bonding, uniform or random point bonding, or a combination thereof, all as are well known in the art.

Although bonding station 26 has been illustrated in FIG. 1 as heated calender rolls, the rolls can, in other embodiments of the invention, be replaced by other thermal activation zones. For example, the bonding station may be in the form of a through-air bonding oven, a microwave or other RF treatment zone. Other bonding stations, such as ultrasonic welding stations, can also be used in the invention. In addition other bonding techniques known in the art can be used, such as adhesive bonding.

The thermally bonded nonwoven fabric is then wound by conventional means onto roll 29. The nonwoven fabric can be stored on roll 29 or passed to end use manufacturing processes, for example for use as a component in a disposable personal care article such as diapers and the like, medical fabrics, wipes, and the like.

Figure 2:
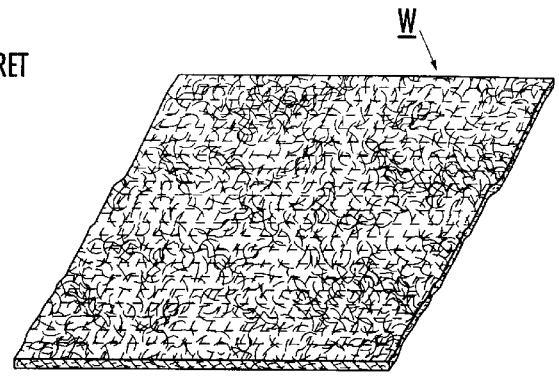
FIG. 2 is a fragmentary plan view of a nonwoven web of the invention.
Figure 3:
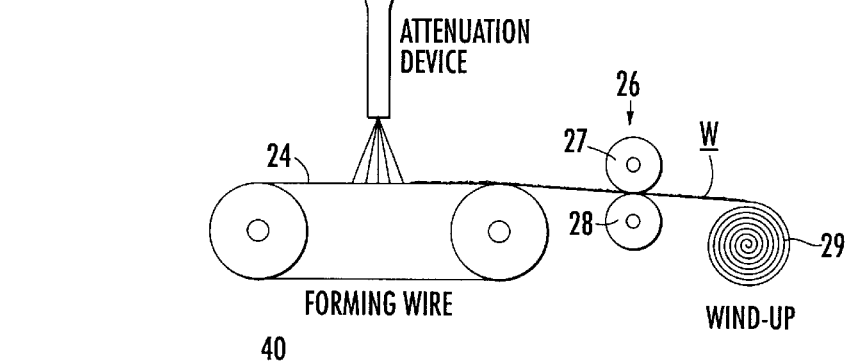
FIG. 3 is a diagrammatical cross-sectional view of a nonwoven fabric laminate in accordance with the invention.
Figure 3:
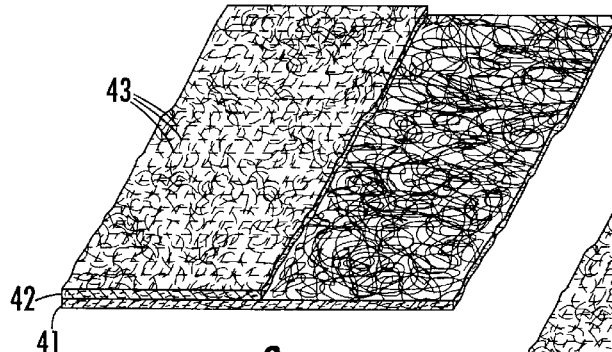

FIG. 2 illustrates a thermally bonded spunbonded nonwoven fabric W produced in accordance with the present invention. The nonwoven fabric W may be laminated into structures having a variety of desirable end-use characteristics. FIG. 3 is a diagrammatical cross-sectional view of a nonwoven fabric laminate in accordance with one embodiment of the invention. In this embodiment, the laminate, generally indicated at 40, is a two-ply laminate. Ply 41 comprises a web which may be a meltblown nonwoven web, a spunbonded web, or a web of staple fibers. Ply 42 comprises a nonwoven web formed of a highly dispersed blend of polyolefin polymers, such as the nonwoven fabric W produced as described above.

The plies may be bonded and/or laminated in any of the ways known in the art. Lamination and/or bonding may be achieved, for example, by hydroentanglement of the fibers, spot bonding, through-air bonding and the like. For example, when ply 41 is a fibrous web, lamination and/or bonding may be achieved by hydroentangling, spot bonding, through-air bonding and the like. In the embodiment shown in FIG. 3, plies 41 and 42 are laminated together by passing through a heated patterned calender to form discrete thermal point bonds indicated at 43. It is also possible to achieve bonding through the use of an appropriate bonding agent, i.e., an adhesive. The term spot bonding is inclusive of continuous or discontinuous pattern bonding, uniform or random point bonding or a combination thereof, all as are well known in the art.

The bonding may be made after assembly of the laminate so as to join all of the plies or it may be used to join only selected of the fabric plies prior to the final assembly of the laminate. Various plies can be bonded by different bonding agents in different bonding patterns. Overall, laminate bonding can also be used in conjunction with individual layer bonding.

Laminates of a spunbond web from the highly blended polymer dispersion as described above with a web of meltblown microfibers have utility as barrier fabrics in medical applications, protective clothing applications, and for hygiene applications such as barrier leg cuffs. Of particular utility for hygiene applications are spunbond/meltblown laminates of reduced basis weight, such as made with a 17 grams per square meter (gsm) spunbonded web of this invention and 2–3 gsm meltblown web. Such barrier laminates could be used, for example, as barrier leg cuffs in diapers.

Figure 4:
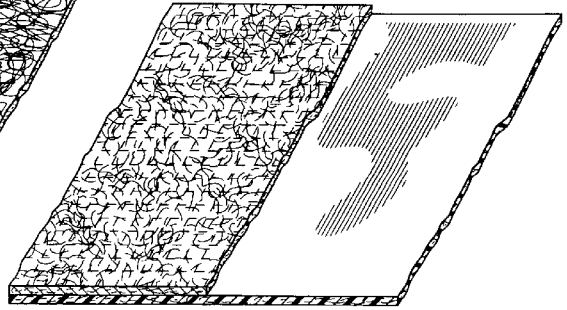
FIG. 4 is a diagrammatical cross-sectional view of a laminate of the nonwoven fabric of FIG. 2 with a film.

Another type of nonwoven fabric laminate may be made by combining nonwoven web of this invention with a film, for example a film of a thermoplastic polymer, such as a polyolefin, to make barrier fabrics useful for hygiene applications such as barrier leg cuffs and diaper backsheets. FIG. 4 illustrates one such laminate, which includes a ply or layer 42' comprising a nonwoven web formed of a highly dispersed blend of polyolefin polymers, such as the nonwoven fabric W of FIG. 2, laminated to a polyolefin film layer 44, such as for example a polyethylene film of a thickness of 0.8 to 1 mil. Lamination and/or bonding of the nonwoven layer 42' to the film layer 44 can be achieved by adhesive lamination using a continuous or discontinuous layer of adhesive. This adhesive approach may yield a diaper backsheet with superior softness and hand. The nonwoven fabric laminate could also be produced by thermal lamination of the nonwoven fabric of this invention and film webs together. This approach has the advantage of eliminating the cost of the adhesive. It may also be desirable to utilize coextruded film webs that include a sealing/bonding layer in combination with a polyolefin layer in the film web that, when combined with the nonwoven fabrics of the invention, maximize softness and good thermal bonding characteristics. The nonwoven fabric laminate could also be produced by direct extrusion of the film layer 44 on ply 42'.

EXAMPLE 1

Ninety percent by weight of a linear low density polyethylene (LLDPE) with a melt flow of 27 (Dow 6811 LLDPE) and ten percent by weight of a polypropylene (PP) polymer with a melt flow approximately 35 (Aristech CP 350 J) were dry blended in a rotary mixer. The dry-blended mixture was then introduced to the feed hopper of an extruder of a spunbond nonwoven spinning system. Continuous filaments were meltspun by a slot draw process at a filament speed of approximately 600 m/min and deposited upon a collection surface to form a spunbond nonwoven web, and the web was thermally bonded using a patterned roll with 12% bond area. For comparison purposes, nonwoven spunbond fabrics were produced under similar conditions with the same polymers, using 100% PP and 100% LLDPE.

As shown in table 1, the 100% LLDPE spunbond samples exhibited superior softness (75 and 77.5) compared to the 100% polypropylene spunbond sample (30). However, the abrasion resistance of the 100% LLDPE sample, as seen from the fuzz measurement, was relatively high (12.5 and 2.4) compared to the 100% PP sample (0.3). The nonwoven fabric formed from the 90% LLDPE/ 10% PP blend had a high softness (67.5) only slightly less than the 100% LLDPE fabric, and had abrasion resistance (fuzz value) of 1.0 mg., which is significantly better than the values seen for 100% LLDPE. The blend sample also showed improved CD tensile compared to products made with 100% LLDPE.

TABLE 1

| Sample | A | B | C | D |
| --- | --- | --- | --- | --- |
| C = comparison I = invention | C | C | C | I |
| Composition: | | | | |
| % polypropylene | 100 | 0 | 0 | 10 |
| % polyethylene | 0 | 100 | 100 | 90 |
| filament dia. (microns) | 17.5 | 20.9 | 20.9 | 22.5 |
| Basis weight (gsm)[1] | 23.1 | 25.2 | 24.6 | 24.8 |
| Loft @ 95 g/in² (mils)[2] | 9.8 | 9.0 | 7.8 | 9.3 |
| Fuzz (mg)[3] | 0.3 | 12.5 | 2.4 | 1.0 |
| Softness[4] | 30 | 75 | 77.5 | 67.5 |
| Strip Tensile (g/cm)[5] | | | | |
| CD | 557 | 139 | 157 | 164 |
| MD | 1626 | 757 | 639 | 467 |
| Peak Elongation (%) | | | | |
| CD | 90 | 116 | 129 | 108 |
| MD | 93 | 142 | 106 | 119 |
| TEA (in.g./in | | | | |
| CD | 852 | 297 | 346 | 354 |
| MD | 2772 | 2222 | 1555 | 1389 |

[1]gsm = grams per square meter
[2]Loft was determined by measuring the distance between the top and the bottom surface of the fabric sheet while the sheet was under compression loading of 95 grams per square inch. The measurement is generally the average of 10 measurements.
[3]Fuzz is determined by repeatedly rubbing a soft elastomeric surface across the face of the fabric a constant number of times. The fiber abraded from the fabric surface is then weighed. Fuzz is reported as mg weight observed.
[4]Softness was evaluated by an organoleptic method wherein an expert panel compared the surface feel of Example Fabrics with that of controls. Results are reported as a softness score with higher values denoting a more pleasing hand. Each reported value is for a single fabric test sample, but reflects the input of several panel members.
[5]Tensile, Peak Elongation and TEA were evaluated by breaking a one inch by seven inch long sample generally following ASTM D1682-64, the one-inch cut strip test. The instrument cross-head speed was set at 5 inches per minute and the gauge length was set at 5 inches per minute. The Strip Tensile Strength, reported as grams per centimeter, is generally the average of at least 8 measurements. Peak Elongation is the percent increase in length noted at maximum tensile strength. TEA, Total Tensile Energy Absorption, is calculated from the area under the stress-strain curve generated during the Strip Tensile test.

EXAMPLE 2 (Control)

A control fiber was made by introducing 100% Dow LLDPE 2500 (55 MI, 0.923 density) to a feed hopper of a spinning system equipped with an extruder, a gear pump to control polymer flow at 0.75 gram per minute per hole, and a spinneret with 34 holes of L/D=4:1 and a diameter of 0.2 mm. Spinning was carried out using a melt temperature in the extruder of 215° C. and a pack melt temperature of 232° C. After air quench, the resulting filaments were drawn down at a filament speed of approximately 1985 m/min using an air aspiration gun operating at 100 psig to yield a denier of 3.01 and denier standard deviation of 0.41.

EXAMPLE 3

Ninety parts by weight of Dow LLDPE Type 2500 (55 MI, 0.923 density) and ten parts of Himont X 10054-12-1 polypropylene (65 MFR) were dry blended in a rotary mixer and then introduced to the feed hopper of the spinning system described in Example 2. Spinning was carried out using a pack melt temperature of 211° C. After air quench, the resulting filaments were drawn down at a filament speed of approximately 2280 M/Min using an air aspiration gun operating at 100 psig to yield a denier of 2.96 and a denier standard deviation of 1.37.

EXAMPLE 4

Ninety parts by weight of Dow LLDPE Type 2500 (55 MI, 0.923 density) and ten parts of Soltex 3907 polypropylene (35 MFR, 1.74 die swell, CR grade) were dry blended in a rotary mixer and then introduced to the feed hopper of the spinning system described in Example 2. Spinning was carried out using a pack melt temperature of 231° C. and an extruder melt temperature of 216° C. After air quench, the resulting filaments were drawn down at a filament speed of approximately 2557 M/Min using an air aspiration gun operating at 100 psig to yield a denier of 2.64 and a denier standard deviation of 0.38.

EXAMPLE 5

Ninety parts by weight of Dow LLDPE Type 6808A (36 MI, 0.940 density) and ten parts of Soltex 3907 polypropylene (35 MFR, 1.74 die swell, CR grade) were dry blended in a rotary mixer and then introduced to the feed hopper of the spinning system described in Example 2. Spinning was carried out using a pack melt temperature of 231° C. and an extruder melt temperature of 216° C. After air quench, the resulting filaments were drawn down at a filament speed of approximately 2129 M/Min using an air aspiration gun operating at 100 psig to yield a denier of 3.17 and a denier standard deviation of 2.22.

The quality of spinning for a given formulation has been found to roughly correlate with the denier standard deviation. A reduced standard deviation suggests more stable or higher quality spinning. Thus it is unexpected and contrary to the teaching of the prior art that the blend using a 35 MFR polypropylene in Example 4 yielded a more stable spinning than seen with the corresponding LLDPE control in Example 2.

EXAMPLE 6

Eighty parts by weight of a linear low density polyethylene pellets of 55 melt index and 0.925 g/cc density and twenty parts by weight polypropylene pellets of 35 melt flow rate were dry blended in a rotary mixer. The dry-blended mixture was then introduced to the feed hopper of a spinning system equipped with an extruder with a 30:1 l/d ratio, a static mixer, and a gear pump for feeding the molten polymer to a heated melt block fitted with a spinneret. Filaments were extruded from the spinneret and drawn using air aspiration.

EXAMPLE 7

Samples of continuous filament spunbonded nonwoven webs were produced from blends of a linear low density polyethylene with a melt flow rate of 27 (Dow 6811A LLDPE) and a polypropylene homopolymer (Appryl 3250YR1, 27 MFR) in various blend proportions. Control fabrics of 100 percent polypropylene and 100 percent polyethylene were also produced under similar conditions. The fabrics were produced by melt spinning continuous filaments of the various polymers or polymer blends, attenuating the filaments pneumatically by a slot draw process, depositing the filaments on a collection surface to form webs, and thermally bonding the webs using a patterned calender roll with a 12 percent bond area. The fabrics had a basis weight of approximately 25 gsm and the filaments had an average mass/length of 3 dtex. The tensile strength and elongation properties of these fabrics and their abrasion resistance were measured, and these properties are listed in Table 2. As shown, the 100 percent polypropylene control fabric had excellent abrasion resistance, as indicated by no measurable fuzz generation; however the fabrics had relatively low elongation. The 100 percent polyethylene control fabric exhibited good elongation properties, but very poor abrasion resistance (high fuzz values and low Taber abrasion resistance) and relatively low tensile strength. Surprisingly, the fabrics of the invention made of blends of polypropylene and polyethylene exhibited an excellent combination of abrasion resistance, high elongation, and good tensile strength. It is noted that the CD elongation values of the blends actually exceeded that of the 100% polyethylene control. This surprising increase in elongation is believed to be attributable to the better bonding of the filaments of the blend as compared to the bonding achieved in the 100% polyethylene control, which resulted in the fabrics of the invention making good use of the highly elongatable filaments without bond failure.

TABLE 2

MECHANICAL PROPERTIES OF
POLYPROPYLENE (PP)/POLYETHYLENE (PE) BLEND FABRICS

| Fabric | 100% PP | 25/75 PP/PE | 15/85 PP/PE | 100% PE |
|---|---|---|---|---|
| MD Tensile (g/cm)[6] | 925 | 764 | 676 | 296 |
| CD Tensile (g/cm)[6] | 405 | 273 | 277 | 63 |
| MD Elongation (%)[6] | 62 | 170 | 199 | 168 |
| CD Elongation (%)[6] | 70 | 190 | 224 | 131 |
| Fuzz (mg)[7] | 0.0 | 0.3 | 0.5 | 19.0 |
| Taber Abrasion[8] (cycles-rubber wheel) | 40 | 32 | 22 | 10 |
| Taber Abrasion[8] (cycles - felt wheel) | 733 | 200 | 500 | 15 |

[6]Tensile and Peak Elongation were evaluated by breaking a one inch by seven inch long sample generally following ASTM D1682-64, the one-inch cut strip test. The instrument cross-head speed was set at 5 inches per minute and the gauge length was set at 5 inches per minute. The Strip Tensile Strength, reported as grams per inch, is generally the average of at least 8 measurements. Peak Elongation is the percent increase in length noted at maximum tensile strength.
[7]Fuzz is determined by repeatedly rubbing a soft elastomeric surface across the face of the fabric a constant number of times. The fiber abraded from the surface is then weighed. Fuzz is reported as mg weight observed.
[8]Conducted according to ASTM D3884-80 where the number of cycles was counted until failure. Failure was defined as the appearance of a hole of one square millimeter or greater in the surface of the fabric.

That which we claim is:

1. A disposable absorbent personal care product comprising a plurality of layers, at least one of said layers comprising a nonwoven fabric comprised of fibrous material in the form of continuous filaments or staple fibers of a size less than 15 dtex/filament formed of a dispersed blend of at least two different polyolefin polymers, said polymers being present as a lower-melting dominant continuous phase and at least one higher-melting noncontinuous phase dispersed therein, said lower-melting continuous phase forming at least 70 percent by weight of the fibrous material and comprising a linear low density polyethylene polymer of a melt index of greater than 10 g/10 min and a density of 0.945 g/cc or less and said at least one higher-melting noncontinuous phase comprising a polypropylene polymer with melt flow rate of greater than 20 g/10 min., wherein a ratio of the melt index of said polyethylene to the melt flow rate of said polypropylene polymer ranges from 0.5 to 1.57.

2. The disposable personal care product according to claim 1 wherein the fibrous material comprises continuous filaments randomly arranged and bonded to one another at discrete locations to form a nonwoven spunbonded fabric.

3. The disposable personal care product according to claim 1 wherein said lower-melting continuous phase forms at least 80 percent by weight of the fiber and comprises a linear low density polyethylene having a density of 0.90–0.945 g/cc and a melt index of greater than 25.

4. The disposable personal care product according to claim 1 wherein said lower-melting polymer phase comprises linear low density polyethylene with a melt index of 27 and said higher-melting polymer phase comprises an isotactic polypropylene with a melt flow rate of 35 g/10 minutes.

5. The disposable personal care product according to claim 1 wherein said disposable absorbent personal care product is a diaper or incontinence pad.

6. The disposable personal care product according to claim 1 wherein said disposable absorbent personal care product is a diaper having leg cuffs, said leg cuffs being formed by said least one layer comprised of fibers a highly dispersed blend of at least two different polyolefin polymers.

7. The disposable personal care product according to claim 1 wherein said disposable absorbent personal care product is a sanitary napkin.

8. The disposable personal care product according to claim 1 wherein a ratio of said melt index of said linear low density polyethylene polymer to said melt flow rate of said polypropylene polymer ranges from 0.77 to 1.57.

9. A diaper comprising a plurality of layers, at least one of said layers comprising a nonwoven fabric comprised of fibrous material in the form of continuous filaments of a size less than 15 dtex/filament randomly arranged and thermally bonded to one another to form a nonwoven spunbonded fabric, said continuous filaments formed of a dispersed blend of at least two different polyolefin polymers, said polymers being present as a lower-melting dominant continuous phase and at least one higher-melting noncontinuous phase dispersed therein, said lower-melting continuous phase forming at least 70 percent by weight of the fibrous material and comprising a linear low density polyethylene polymer of a melt index of greater than 10 g/10 min and a density of 0.945 g/cc or less and said at least one higher-melting noncontinuous phase comprising isotactic polypropylene with melt flow rate of greater than 20 g/10 min., wherein a ratio of the melt index of said polyethylene to the melt flow rate of said polypropylene ranges from 0.5 to 1.57.

10. The diaper according to claim 9 wherein said lower-melting continuous phase forms at least 80 percent by weight of the filaments and comprises a linear low density polyethylene having a density of 0.90–0.945 g/cc and a melt index of greater than 25.

11. The diaper according to claim 9 wherein said lower-melting polymer phase comprises linear low density polyethylene with a melt index of 27 and said higher-melting polymer phase comprises an isotactic polypropylene with a melt flow rate of 35 g/10 minutes.

12. The diaper according to claim 9 wherein said diaper has leg cuffs, said leg cuffs being formed by said least one layer comprised of filaments a highly dispersed blend of at least two different polyolefin polymers.

13. The diaper according to claim 9 wherein a ratio of said melt index of said linear low density polyethylene polymer to said melt flow rate of said polypropylene polymer ranges from 0.77 to 1.57.

* * * * *